(12) United States Patent  
Liu

(10) Patent No.: US 9,065,503 B2  
(45) Date of Patent: Jun. 23, 2015

(54) PRECODING PROCESSING METHOD, BASE STATION, AND COMMUNICATIONS SYSTEM

(71) Applicant: Huawei Technologies Co., Ltd., Shenzhen, Guangdong (CN)

(72) Inventor: Sheng Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/954,621

(22) Filed: Jul. 30, 2013

(65) Prior Publication Data

US 2013/0315328 A1     Nov. 28, 2013

Related U.S. Application Data

(63) Continuation of application No. PCT/CN2011/078976, filed on Aug. 26, 2011.

(30) Foreign Application Priority Data

Jan. 30, 2011   (CN) .......................... 2011 1 0033181

(51) Int. Cl.
    *H04B 7/04*        (2006.01)
    *H04B 7/06*        (2006.01)
    *H04B 7/08*        (2006.01)

(52) U.S. Cl.
    CPC .............. *H04B 7/046* (2013.01); *H04B 7/0413* (2013.01); *H04B 7/0617* (2013.01); *H04B 7/0663* (2013.01); *H04B 7/086* (2013.01)

(58) Field of Classification Search
    CPC ......... H04L 7/024; H04L 7/026; H04L 7/028; H04L 7/04; H04L 7/0404; H04L 7/0408; H04L 7/0413; H04L 7/0452; H04L 7/0456; H04L 7/0486; H04L 7/0491; H04B 7/024; H04B 7/026; H04B 7/028; H04B 7/04; H04B 7/0404; H04B 7/0408; H04B 7/0413; H04B 7/0452; H04B 7/0456; H04B 7/0486; H04B 7/0491; H04B 7/043; H04B 7/0434; H04B 7/046; H04B 7/0478; H04B 7/0495; H04B 7/0617; H04B 7/0663; H04B 7/086
    USPC .......... 375/259–262, 265, 267; 370/310, 328, 370/334, 339; 455/456.1, 456.5, 456.6, 455/457, 500, 524–526
    See application file for complete search history.

(56) References Cited

U.S. PATENT DOCUMENTS

| 7,893,871 B1 * | 2/2011 | Lee et al. ....................... 342/377 |
| 8,229,017 B1 * | 7/2012 | Lee et al. ....................... 375/267 |
| 8,498,358 B2 * | 7/2013 | Clerckx et al. ................. 375/267 |

(Continued)

FOREIGN PATENT DOCUMENTS

| CN | 1855759 A | 11/2006 |
| CN | 101800581 A | 8/2010 |

*Primary Examiner* — Young T Tse

(74) *Attorney, Agent, or Firm* — Leydig, Voit & Mayer, Ltd.

(57) ABSTRACT

Embodiments of the present invention provide a precoding processing method, a base station, and a communications system. The precoding processing method includes: implementing beamforming on an antenna array according to information about a direction of arrival of a user equipment to obtain a transformation matrix; transforming a channel matrix according to the transformation matrix to obtain an equivalent channel matrix; and obtaining a precoding matrix required for precoding processing according to the equivalent channel matrix. According to the embodiments of the present invention, after a MIMO system is implemented based on a single antenna array, signals transmitted between the UE and the base station are orthogonal in each beam direction, thereby obtaining a degree-of-freedom gain.

9 Claims, 5 Drawing Sheets

(56) References Cited

U.S. PATENT DOCUMENTS

| | | |
|---|---|---|
| 2007/0126633 A1 | 6/2007 | Lee |
| 2008/0192852 A1 | 8/2008 | Kent et al. |
| 2008/0287075 A1* | 11/2008 | Kim et al. .................... 455/101 |
| 2009/0058727 A1 | 3/2009 | Sun et al. |
| 2010/0265843 A1* | 10/2010 | Yang et al. .................... 370/252 |
| 2012/0082256 A1* | 4/2012 | Gaur et al. .................... 375/260 |

* cited by examiner

US 9,065,503 B2

PRECODING PROCESSING METHOD, BASE STATION, AND COMMUNICATIONS SYSTEM

CROSS-REFERENCE TO RELATED APPLICATIONS

This application is a continuation of International Application No. PCT/CN2011/078976, filed on Aug. 26, 2011, which claims priority to Chinese Patent Application No. 201110033181.4, filed with the Chinese Patent Office on Jan. 30, 2011 and entitled "PRECODING PROCESSING METHOD, BASE STATION, AND COMMUNICATIONS SYSTEM", both of which are incorporated herein by reference in their entireties.

FIELD OF THE INVENTION

Embodiments of the present invention relate to the communications field, and in particular to a precoding processing method, a base station, and a communications system.

BACKGROUND OF THE INVENTION

For a single-antenna radio communications system, the existing modulation and coding technologies may approach the theoretical Shannon limit very well. Therefore, a multiple-antenna technology is developed to further increase the baud rate and the reliability of the radio communications system.

A conventional method for increasing the baud rate and the reliability by using the multiple-antenna technology is a space division multiplexing method based on the multiple input multiple output (Multiple Input Multiple Output, MIMO for short) technology. With the MIMO-based space division multiplexing method, the space division multiplexing is implemented mainly by introducing multiple antennas to both a user equipment (User Equipment, UE for short) and a base station device, for example, an eNodeB. If both a receiving end and a transmitting end have already known information about a channel matrix, an optimal MIMO system is capable of obtaining a high degree-of-freedom gain and a large system capacity by using a precoding scheme based on singular value decomposition implemented on the channel matrix. However, for the MIMO-based space division multiplexing method, computational complexity is high when the UE or the eNodeB estimates the channel matrix according to an orthogonal reference signal of each antenna, and because of the time-varying characteristic of the channel matrix, the UE or the eNodeB needs to continuously update the channel matrix estimation and provide feedback to a peer end, thereby causing a high overhead.

A beamforming method based on an array antenna is developed to solve the preceding problem. That is, mainly, the eNodeB implements beamforming on a single array antenna, then estimates a direction of arrival (Direction of Arrival, DoA for short) of a received signal in a beam direction to obtain the channel matrix, and implements precoding after the singular value decomposition according to the channel matrix. Compared with the conventional MIMO-based space division multiplexing method, when the beamforming method based on the array antenna is used, the UE is not required to implement channel estimation and uplink feedback, and the speed of updating the channel matrix is greatly reduced. However, because no degree-of-freedom gain is provided, the capability to increase the system capacity is far weaker than the MIMO-based space division multiplexing method. If the beamforming method based on the array antenna is used, multiple independent array antennas must be used to obtain the degree-of-freedom gain, thereby increasing the system complexity.

Therefore, how to obtain the degree-of-freedom gain becomes a problem to be solved urgently when a MIMO system is implemented based on the single array antenna.

SUMMARY OF THE INVENTION

Embodiments of the present invention provide a precoding processing method and a base station for obtaining a degree-of-freedom gain when a MIMO system is implemented based on a single array antenna.

An embodiment of the present invention provides a precoding processing method, including:
implementing beamforming on an antenna array according to information about a direction of arrival of a user equipment to obtain a transformation matrix;
transforming a channel matrix according to the transformation matrix to obtain an equivalent channel matrix; and
obtaining a precoding matrix required for precoding processing according to the equivalent channel matrix.

An embodiment of the present invention provides a base station, including:
a first processing module, configured to implement beamforming on an antenna array according to information about a direction of arrival of a user equipment to obtain a transformation matrix;
a second processing module, configured to transform a channel matrix according to the transformation matrix obtained by the first processing module to obtain an equivalent channel matrix; and
a third processing module, configured to obtain a precoding matrix required for precoding processing according to the equivalent channel matrix obtained by the second processing module.

An embodiment of the present invention provides a communications system, including a user equipment and the preceding base station, where the user equipment communicates with the base station.

In an embodiment of the present invention, for the single-user MIMO, a base station may implement beamforming on a single array antenna according to information about a direction of arrival of a UE, decompose a channel matrix in a beam direction, obtain an equivalent channel matrix, and obtain an optimal precoding matrix by using the equivalent channel matrix. Therefore, in an embodiment of the present invention, after a MIMO system is implemented based on a single antenna array, signals transmitted between the UE and the base station are orthogonal in each beam direction, thereby obtaining a degree-of-freedom gain.

BRIEF DESCRIPTION OF THE DRAWINGS

To illustrate the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art can derive other drawings from these accompanying drawings without creative efforts.

DETAILED DESCRIPTION OF THE EMBODIMENTS

In order to make the objectives, technical solutions, and advantages of the present invention more comprehensible, the following clearly describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons of ordinary skill in the art based on the embodiments of the present invention without creative effects shall fall within the protection scope of the present invention.

Figure 1:
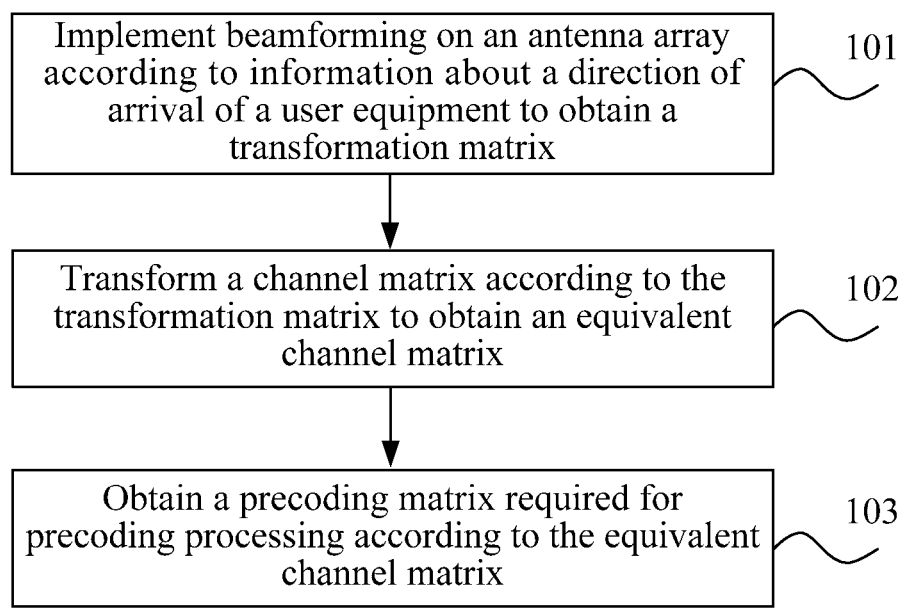
FIG. 1 is a flow chart of a precoding processing method according to an embodiment of the present invention.

FIG. 1 is a flow chart of a precoding processing method according to an embodiment of the present invention. As shown in FIG. 1, the method of this embodiment may include:

Step 101: Implement beamforming on an antenna array according to information about a direction of arrival of a user equipment to obtain a transformation matrix.

A base station may implement the beamforming on the antenna array according to the information about the direction of arrival of a UE to obtain the transformation matrix. Specifically, according to this embodiment, the UE has multiple antennas. The base station may determine the current scattering environment of the UE according to the information about the direction of arrival of an uplink reference signal transmitted by the UE through the multiple antennas.

According to an embodiment, the base station may implement the beamforming on the antenna array according to scattering path information of the uplink reference signal transmitted by the user equipment. Specifically, the scattering path information may be an angle of arrival. It should be understood by persons skilled in the art that the angle of arrival is not the only implementation method, and that the base station only needs to obtain the scattering path information of the UE and know a current scattering state of the UE.

When the UE is currently in a sufficient scattering environment, directions of arrival of the UE are independent of each other and not overlapped with each other. In this case, the base station selects a direction angle from the angle of arrival and implements the beamforming in a beam direction corresponding to the selected direction angle. The number of the selected direction angles may be greater than the number of antenna array elements of the user equipment, and the selected direction angles are independent of each other. For example, the optimization process is as follows:

Implement the beamforming on the antenna array according to the scattering path information of the uplink reference signal transmitted by the user equipment.

According to an embodiment, the scattering path information may be the angle of arrival, so the direction angle may be selected from the angle of arrival of the uplink reference signal transmitted by the user equipment, and the beamforming is implemented in the beam direction corresponding to the selected direction angle. Then, the base station receives the uplink reference signal in the formed beam direction, and obtains a channel matrix according to the uplink reference signal. If the channel matrix is a full-rank matrix, the base station may obtain the transformation matrix by composing a unit space eigenvector corresponding to the formed beam. If the channel matrix is a non-full-rank matrix, the base station may reselect the direction angle from the direction of arrival, implement the beamforming in the beam direction corresponding to the reselected direction angle, and determine the transformation matrix according to the beam direction corresponding to the reselected direction angle until the rank of the transformation matrix is full.

When the UE is currently in an insufficient scattering environment, the directions of arrival of the UE are not independent of each other and may be overlapped. In this case, the base station may select some directions of arrival as the beam direction from the directions of arrival (for example, the angle of arrival of each direction of arrival is different), and implement the beamforming by using the selected beam directions. The beamforming process needs to be optimized continuously in the insufficient scattering environment, for example, the rank of the channel matrix after the beamforming needs to be exchanged between the base station and the UE, thereby obtaining as many independent formed beams as possible. For example, the optimization process is as follows:

Implement the beamforming on the antenna array according to the scattering path information of the uplink reference signal transmitted by the user equipment. According to an embodiment, the scattering path information may be the angle of arrival, so the base station selects, from the angle of arrival of the uplink reference signal transmitted by the user equipment, the direction angle whose received signal strength is higher than a preset threshold, and implements the beamforming on the selected direction angle. Then the base station receives the uplink reference signal in the formed beam direction, and obtains the channel matrix according to the uplink reference signal. If the channel matrix is a full-rank matrix, the base station may obtain the transformation matrix by composing the unit space eigenvector corresponding to the formed beam. If the channel matrix is a non-full-rank matrix, the base station may reselect the direction angle from the direction of arrival, implement the beamforming in the beam direction corresponding to the reselected direction angle, and determine the transformation matrix according to the reselected direction angle, until the channel matrix meets a system optimization condition. The system optimization condition is not limited in this embodiment. Persons skilled in the art may set the system optimization condition according to a factor, such as antenna performance or interference control.

Therefore, if the channel scattering is sufficient, the beams should overlap in an angular domain as little as possible. If the channel scattering is insufficient, the beam direction needs to be adjusted for attempting to receive more non-related data streams. Definitely, the UE is required to feed back, to the base station, the rank corresponding to the channel matrix. This process may need to be repeated many times to obtain the rank as large as possible.

Regardless of the sufficient scattering environment or the insufficient scattering environment, when the base station implements the beamforming on an array antenna, the base station may form n formed beams. It is desirable if the number n of the beams is greater than the number of the antenna array elements of the UE, enabling the UE to form more independent signal streams. The width of the beam depends on physical parameters such as the number of the array elements of the UE, distance, and carrier frequency. Therefore, according to this embodiment, after the beamforming, the base station may obtain a unit space eigenmap corresponding to the formed beam so as to obtain the transformation matrix. The more the formed beams are after the beamforming, the higher the obtained degree-of-freedom gain is.

Step 102: Transform the channel matrix according to the transformation matrix to obtain an equivalent channel matrix.

After implementing the beamforming, the base station transforms the channel matrix according to the transformation matrix. That is, the physical channel matrix is decomposed in the formed beam direction to obtain the equivalent channel matrix.

Step 103: Obtain a precoding matrix required for precoding processing according to the equivalent channel matrix.

According to this embodiment, the base station may obtain the precoding matrix required for precoding processing according to the equivalent channel matrix. However, in the prior art, the precoding matrix is obtained according to the physical channel matrix. For example, the base station may implement singular value decomposition on the equivalent channel matrix to obtain the precoding matrix. The subsequent operations of the base station may be implemented by using the prior art. For example, the precoding matrix is transmitted to the UE, thereby enabling the UE to implement the precoding processing on the transmitted uplink reference signal according to the precoding matrix. The content is not described herein again. Alternatively, the base station may transmit a downlink reference signal to the UE in the formed beam direction, thereby enabling the UE to obtain the precoding matrix according to the downlink reference signal, and to transmit the precoding matrix to the base station. Therefore, the base station may implement the precoding processing according to the precoding matrix.

According to this embodiment, for the single-user MIMO, the base station may implement the beamforming on a single array antenna according to the information about the direction of arrival of the UE, decompose the channel matrix in the beam direction, obtain the equivalent channel matrix, and obtain the optimal precoding matrix by using the equivalent channel matrix. Therefore, according to this embodiment, after a MIMO system is implemented based on the single antenna array, the signals transmitted between the UE and the base station are orthogonal in each beam direction, thereby obtaining a degree-of-freedom gain.

The method of the embodiment shown in FIG. 1 specifically includes an uplink processing method and a downlink processing method. When the uplink processing method is used, the base station decomposes the equivalent channel matrix to obtain the precoding matrix. When the downlink processing method is used, the base station transmits the downlink reference signal to the UE according to the equivalent channel matrix; and the UE obtains the equivalent channel matrix according to the downlink reference signal, and decomposes the equivalent channel matrix to obtain the precoding matrix.

Two embodiments are used below to separately describe the uplink processing method and the downlink processing method in detail.

Figure 2:
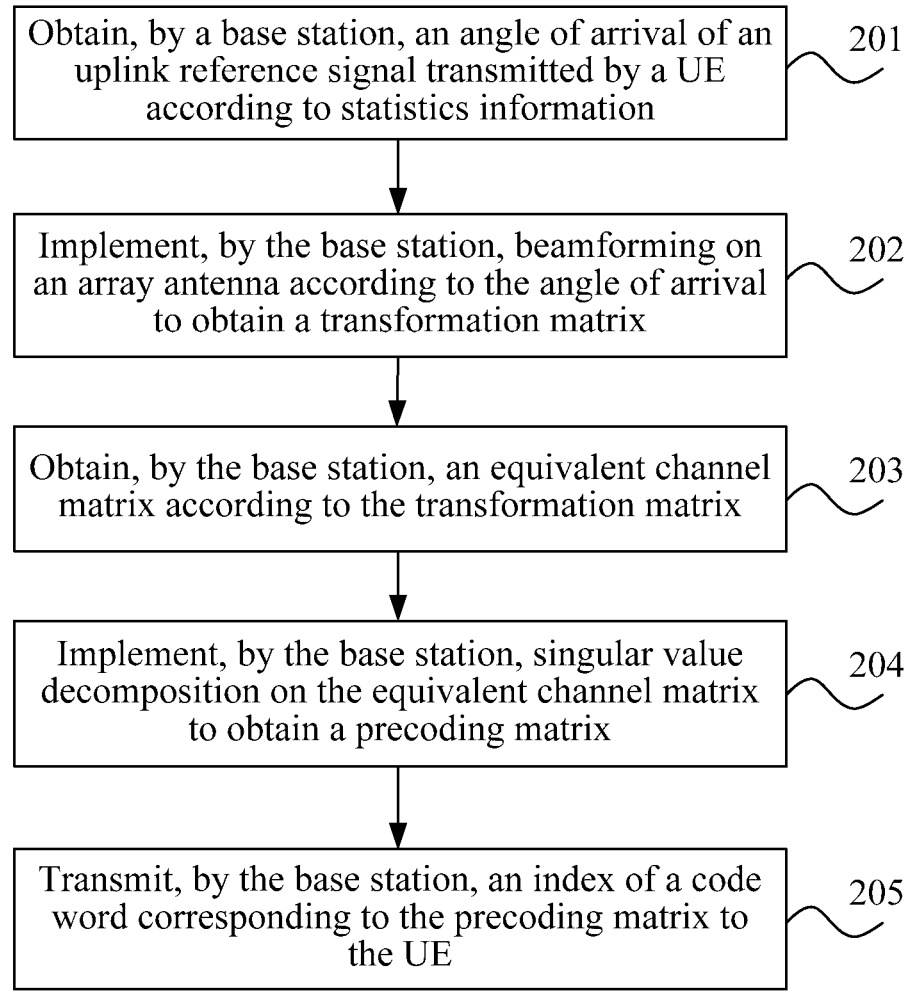
FIG. 2 is a flow chart of a precoding processing method according to another embodiment of the present invention.

FIG. 2 is a flow chart of a precoding processing method according to another embodiment of the present invention. As shown in FIG. 2, an uplink processing method is used in this embodiment. Specifically, the method in this embodiment includes:

Step 201: A base station obtains an angle of arrival of an uplink reference signal transmitted by a UE according to statistics information.

According to this embodiment, the base station implements beamforming by using the angle of arrival (Angle of arrival, AOA for short) of the uplink reference signal transmitted by the UE. In this embodiment, the UE has multiple antennas. Specifically, the base station may estimate the AOA of the uplink reference signal according to the statistics information of the UE. According to this embodiment, the AOA is marked with $\theta_{AOA}$. In the prior art, spectral estimation methods such as eigen subspace decomposition may be used to estimate the $\theta_{AOA}$. The statistics information may be information about the direction of arrival of the UE obtained by the base station that performs interaction with the UE many times. It should be noted that, according to this embodiment, the base station implements the beamforming processing by using the angle of arrival of the UE. It should be understood by persons skilled in the art that the angle of arrival is not the only implementation method, and that the base station only needs to obtain scattering path information of the UE and know a current scattering state of the UE.

Step 202: The base station implements the beamforming on an array antenna according to the angle of arrival to obtain a transformation matrix.

The base station may form n formed beams for the array antenna. It is desirable if the number n of the beams is greater than the number of the antennas of the UE, thereby forming more independent signal streams. The width of the beam depends on physical parameters such as the number of array elements, distance, and carrier frequency. In this embodiment, after the beamforming, a unit space eigenmap corresponding to each beam may be set as follows:

$$e(\theta_i) = \frac{1}{\sqrt{n_A}} \begin{bmatrix} 1 \\ \exp\left(\frac{-j2\pi d\cos\theta_i}{\lambda_c}\right) \\ \exp\left(\frac{-j2\pi \times 2 \times d\cos\theta_i}{\lambda_c}\right) \\ \vdots \\ \exp\left(\frac{-j2\pi \times n_A \times d\cos\theta_i}{\lambda_c}\right) \end{bmatrix} \quad (1)$$

where d is the distance between the array elements of the array antenna, θ is the included angle between a beam direction and the antenna array, $\lambda_c$ is the carrier wavelength, and $n_A$ is the number of the array elements. When the base station uses the preceding formula (1) to implement the beamforming, only the beam direction $\theta_i$ needs to be determined, where i=1, . . . , n and n is the number of the beams.

The following describes how to determine, by the base station, the beam direction $\theta_i$ according to the $\theta_{AOA}$ of the UE in detail to complete the beamforming.

An ideal case is that the surrounding scenario is a sufficient scattering environment, and a signal stream received by the base station in the $\theta_{AOA}$ is basically independent so that a highest degree-of-freedom gain may be obtained. Therefore, in the sufficient scattering case, the base station may select several or all $\theta_{AOA}$ from the $\theta_{AOA}$. The number of the selected $\theta_{AOA}$ is greater than the number of the antenna array elements of a user equipment. Then the base station may implement the beamforming in the beam direction corresponding to the selected $\theta_{AOA}$, and therefore the formed beams may overlap as little as possible. The base station may receive the uplink reference signal from the formed beam, estimate a channel according to the uplink reference signal, and obtain a channel matrix H corresponding to each beam direction. If the H is a full-rank matrix, these beam directions $\theta_i$, that is, the corresponding $\theta_{AOA}$, meet a transmission condition of space diversity. If the H is a non-full-rank matrix, that is, if these beam directions $\theta_i$ are not independent of each other, the base station may reselect the $\theta_{AOA}$ to obtain the beam direction $\theta_i$ again and repeat the preceding process until the rank of the H is full. In addition, when judging whether the rank of the H is full, the base station may refer to the number of conditions of the H. If the number of conditions of the H is small, it is indicated that the strength difference between beam directions is little. Persons skilled in the art may determine the conditions the H needs to meet as required.

In an insufficient scattering case, the signal streams received by the base station in the $\theta_{AOA}$ are not independent of each other. Therefore, the base station may first locate the beam directions $\theta_i$ to some $\theta_{AOA}$ whose received signal strength from the UE is high; for example, the received signal strength is higher than a preset threshold $\theta_{AOA}$. Then the base station may estimate the H of the beam directions $\theta_i$ corresponding to these $\theta_{AOA}$ by using the uplink reference signal. If the H is a full-rank matrix, these beam directions $\theta_i$ meet the transmission condition of space diversity. If the H is not a full-rank matrix, the base station needs to change some beam directions $\theta_i$, locate the beam directions $\theta_i$ to some $\theta_{AOA}$ whose received signal strength from the UE is low, and re judge whether the rank of the H is full. If the H is still the non-full-rank matrix after many attempts of changing the beam direction $\theta_i$, it is indicated that it is probable that the spatial degree-of-freedom is less than the number of antennas of the UE. In this case, the base station may reduce the number n of the formed beams, and repeat the preceding operations until the transmission condition of space diversity is met. However, when the base station determines whether the H meets the transmission condition of the space diversity, factors such as a computational load further need to be considered. Therefore, according to this embodiment, the condition of the H determined by the base station is called a system optimization condition. It should be understood by persons skilled in the art that the optimization condition may be set as required, as long as a possibly large number of beam directions are formed when the determined H meets the system optimization condition.

After the beamforming, the base station obtains the transformation matrix $A(\theta)=[e(\theta_1)\ e(\theta_2)\ \ldots\ e(\theta_n)]$. Each column of the transformation matrix corresponds to a formed beam. Therefore, after the beamforming, the base station determines n beams that may receive the uplink reference signal independently, thereby obtaining a degree-of-freedom gain n.

It should be noted that the specific content of the transmission condition of space diversity is not limited in this embodiment, and persons skilled in the art may determine the transmission condition as required after considering various factors. Therefore, the content is not described herein again. In addition, persons skilled in the art may set a termination condition for the operation that the base station optimizes the beam direction $\theta_i$, such as the computational load of the base station.

Step 203: The base station obtains an equivalent channel matrix according to the transformation matrix.

According to this embodiment, the actual channel matrix H is combined with the beamforming transformation matrix $A(\theta)$ to form the equivalent channel matrix $\tilde{H}$ with a low dimension.

Specifically, the base station uses the unit space eigenmap $e(\theta_i)$ separately corresponding to the n formed beams to implement linear transformation on a signal vector $x_{n_A \times 1}$ received by the array element so as to obtain an n-dimensional received signal vector $y_n$ based on beam decomposition.

Assume that the channel matrix of a MIMO system is H, where the element $h_{ij}$ is a channel gain from the antenna j of the UE to the antenna i of the base station. Therefore, the signal vector obtained by the base station after the array antenna is beamformed is:

$$z=A(\theta)HFx \quad (2)$$

where F is a precoding matrix of the UE, and in this case, the system is equivalent to the MIMO system with n receiving antennas, and $A(\theta)H$ is the equivalent channel matrix $\tilde{H}$:

$$\tilde{H}=A(\theta)H \quad (3)$$

Therefore, the base station may select the precoding matrix according to the equivalent channel matrix $\tilde{H}$ to maximize the capacity after multiplexing.

Step 204: The base station implements singular value decomposition on the equivalent channel matrix to obtain the precoding matrix.

Specifically, the base station implements the singular value decomposition SVD on $\tilde{H}$ to obtain $\tilde{H}=U\Lambda V^*$, where both U and V are unitary matrices, $\Lambda$ denotes a diagonal matrix of a signal to noise ratio (signal to noise ratio, SNR for short) of an independent signal stream in each beam direction. Therefore, the optimal precoding matrix is V.

Step 205: The base station transmits an index of a codeword corresponding to the precoding matrix to the UE.

Because a heavy data traffic is generated during direct transfer of the precoding matrix V, feedback overhead caused by quick update of the channel matrix H is high, and a precise feedback is not required, the base station may select a group of prestored codebooks, and feed back, to the UE, a precoding matrix index (Precoding Matrix Index PMI for short) corresponding to the codeword after the precoding matrix V is quantized by using the corresponding codebook, thereby reducing the feedback overhead.

The subsequent operations of the UE may be implemented by using the prior art. For example, the precoding matrix to be used may be determined according to the received PMI, the precoding matrix determined by the UE is the same as the precoding matrix obtained by the base station in step 204, and then the UE may quantize the precoding matrix to obtain the codebook and transmit the signal according to the codebook. Therefore, the content is not described herein again.

According to this embodiment, for the single-user MIMO, the base station may implement the beamforming on a single array antenna according to the location of the UE and the scattering scenario information, decompose the channel matrix in the beam direction, obtain the equivalent channel matrix, and obtain the optimal precoding matrix by using the equivalent channel matrix. Therefore, according to this embodiment, after a MIMO system is implemented based on the single antenna array, the signals transmitted between the UE and the base station are orthogonal in each beam direction, a degree-of-freedom gain is obtained, and the feedback overhead is reduced when the base station transmits the precoding matrix to the UE.

Figure 3:
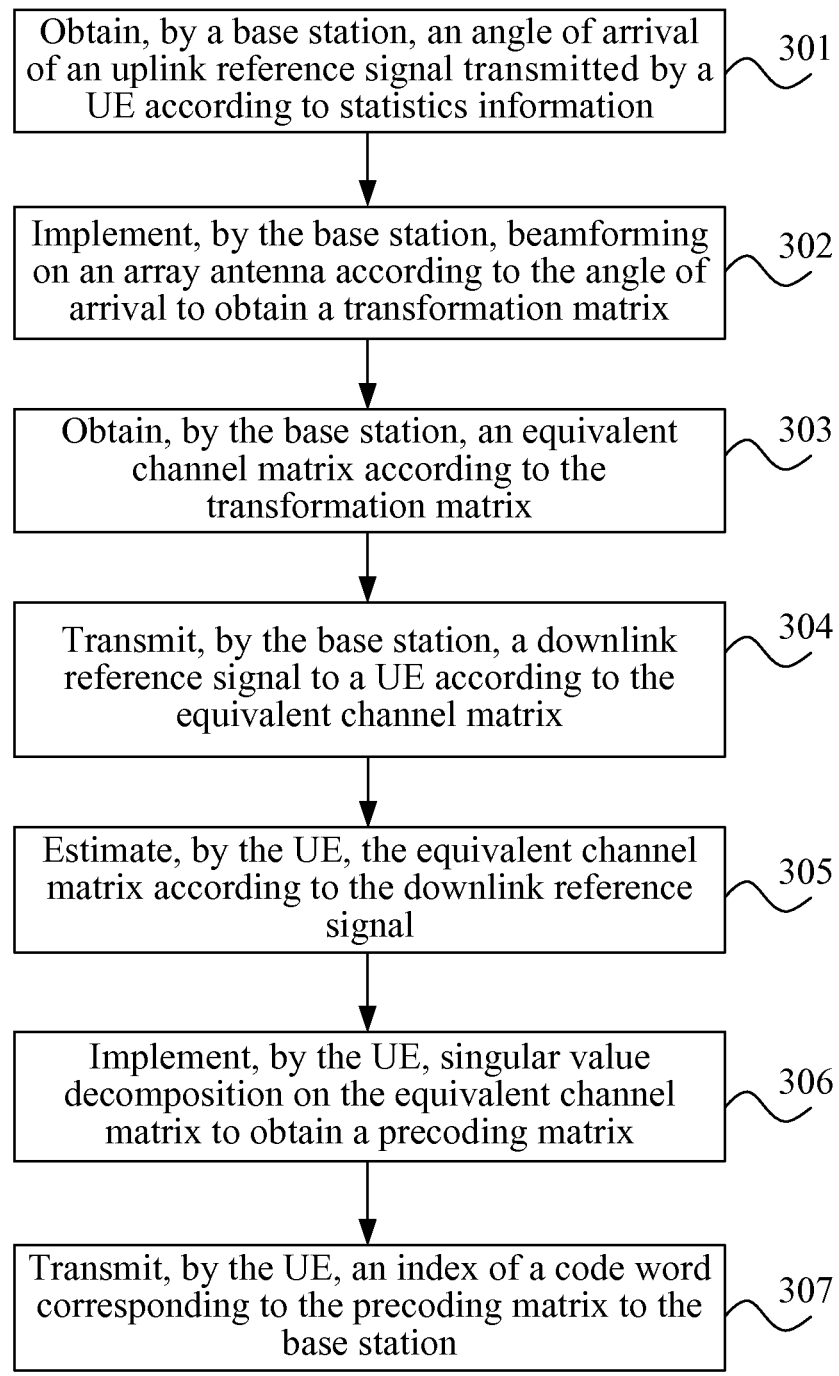
FIG. 3 is a flow chart of a precoding processing method according to still another embodiment of the present invention.

FIG. 3 is a flow chart of a precoding processing method according to still another embodiment of the present invention. As shown in FIG. 3, a downlink processing method is used in this embodiment. Specifically, the method in this embodiment includes:

Step 301: A base station obtains an angle of arrival of an uplink reference signal transmitted by a UE according to statistics information.

Step 302: The base station implements beamforming on an array antenna according to the angle of arrival to obtain a transformation matrix.

Step 303: The base station obtains an equivalent channel matrix according to the transformation matrix.

The implementation method of steps 301-303 in this embodiment is similar to that of steps 201-203 in the method embodiment shown in FIG. 2. Therefore, the content is not described herein again.

Step 304: The base station transmits the downlink reference signal to the UE according to the equivalent channel matrix.

The base station transmits the downlink reference signal to the UE according to the equivalent channel matrix. That is, the downlink reference signal transmitted through a physical array element is equivalent to the downlink reference signal transmitted in the beamforming direction.

If the beamforming is not implemented on a single array antenna, the base station needs to estimate a channel gain from each array element of the array antenna to an antenna of the UE, and the required downlink reference signal needs to correspond to each array element and is independent of each other. The number of the array elements that use the array antenna is usually large, for example 16 or 32, so, to allocate a large number of orthogonal downlink reference signals to the UE at the same time may significantly increase the difficulty of system design. In addition, interference between the downlink reference signals in a cell is caused more easily, thereby influencing the degree of accuracy of channel estimation.

By comparison, according to this embodiment, before the base station transmits the downlink reference signal, the beamforming is required to be implemented; therefore, the downlink reference signal only needs to be transmitted in each beam direction. Specifically, assume that the direct physical channel matrix between the antenna of the UE and each array element of the array antenna of the base station is H', the equivalent channel matrix obtained in step 303 is $A(\theta)=[e(\theta_1)\ e(\theta_2)\ \ldots\ e(\theta_n)]$, and the equivalent channel matrix obtained by implementing the beamforming is $\tilde{H}'$:

$$\tilde{H}'=A(\theta)H' \quad (4)$$

The array antenna may be equivalent to a few of beams in an angular domain after the base station implements the beamforming. Therefore, in this embodiment, the number of the required downlink reference signals only needs to be equal to the number of the beams. After the beamforming, the number of the beams is usually less than the number of array elements of the array antenna. Therefore, compared with the prior art, in this embodiment, the number of the downlink reference signals is reduced, so the complexity of the system design is reduced, and interference from a neighboring cell is avoided.

Step 305: The UE estimates the equivalent channel matrix according to the downlink reference signal.

The downlink reference signal received by the UE from the base station is denoted as:

$$z=A(\theta)H'Fx=\tilde{H}'Fx \quad (5)$$

where F denotes a precoding matrix used by the base station to implement precoding on the downlink reference signal.

The UE may estimate the equivalent channel matrix $\tilde{H}'$ according to the downlink reference signal.

It should be noted that the beamforming on the array antenna is transparent to the UE. Therefore, the UE is unaware of the beamforming vector $A(\theta)$, and the UE only uses the equivalent channel matrix $A(\theta)H'$ obtained through estimation as the channel matrix.

Step 306: The UE implements singular value decomposition on the equivalent channel matrix to obtain the precoding matrix.

The UE implements the SVD on the $\tilde{H}'$ and obtains $\tilde{H}+=U\Sigma V$, where both U and V are unitary matrices, and $\Sigma$ is a diagonal matrix. The unitary matrix V is the precoding matrix.

Step 307: The UE transmits an index of a codeword corresponding to the precoding matrix to the base station.

The UE quantizes the V based on a known codebook and then transmits, to the base station, a PMI corresponding to the quantized codebook.

The subsequent operations may be implemented by using the prior art. That is, the base station determines the precoding matrix to be used according to the received PMI and some other factors such as the capacity of the entire network. Then the UE receives the signal according to the used codebook. That is, the UE may multiply the received signal by the corresponding U matrix to implement signal space rotation, and then implement demodulation and detection. Therefore, the content is not described herein again.

According to this embodiment, for the single-user MIMO, the base station may implement the beamforming on a single array antenna according to the location of the UE and the scattering scenario information, decompose the channel matrix in the beam direction, obtain the equivalent channel matrix, and generate the downlink reference signal by using the equivalent channel matrix. Therefore, the number of the downlink reference signals generated in this embodiment is equal to the number of the beams and is less than the number of the array elements. Therefore, according to this embodiment, the number of the downlink reference signals is reduced, the complexity of the system design is reduced, and interference in the neighboring cell is avoided. In addition, according to this embodiment, when a MIMO system is implemented based on the single antenna array, the signals transmitted between the UE and the base station are orthogonal in each beam direction, thereby obtaining the degree-of-freedom gain.

Figure 4:
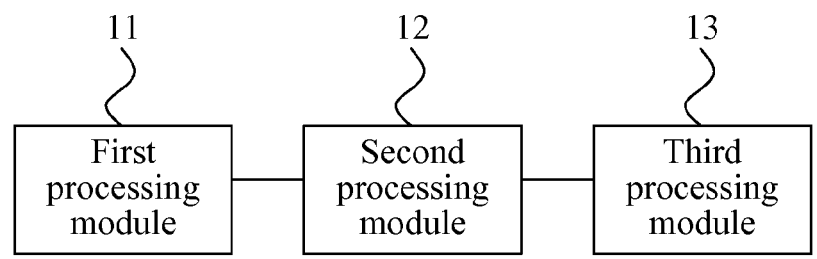
FIG. 4 is a schematic structural diagram of a base station according to an embodiment of the present invention.

FIG. 4 is a schematic structural diagram of a base station according to an embodiment of the present invention. As shown in FIG. 4, the base station in this embodiment includes a first processing module 11, a second processing module 12, and a third processing module 13. The first processing module 11 is configured to implement beamforming on an antenna array according to information about a direction of arrival of a user equipment to obtain a transformation matrix; the second processing module 12 is configured to transform a channel matrix according to the transformation matrix obtained by the first processing module 11 to obtain an equivalent channel matrix; and the third processing module 13 is configured to obtain a precoding matrix required for precoding processing according to the equivalent channel matrix obtained by the second processing module 12.

According to this embodiment, the base station may be configured to implement the method in the method embodiment shown in FIG. 1, and the implementation principle is similar, which is not described herein again.

According to this embodiment, for the single-user MIMO, the base station may implement the beamforming on a single array antenna according to the information about the direction of arrival of the UE, decompose the channel matrix in the beam direction, obtain the equivalent channel matrix, and obtain the optimal precoding matrix by using the equivalent channel matrix. Therefore, according to this embodiment, after a MIMO system is implemented based on the single antenna array, the signals transmitted between the UE and the base station are orthogonal in each beam direction, thereby obtaining a degree-of-freedom gain.

Figure 5:
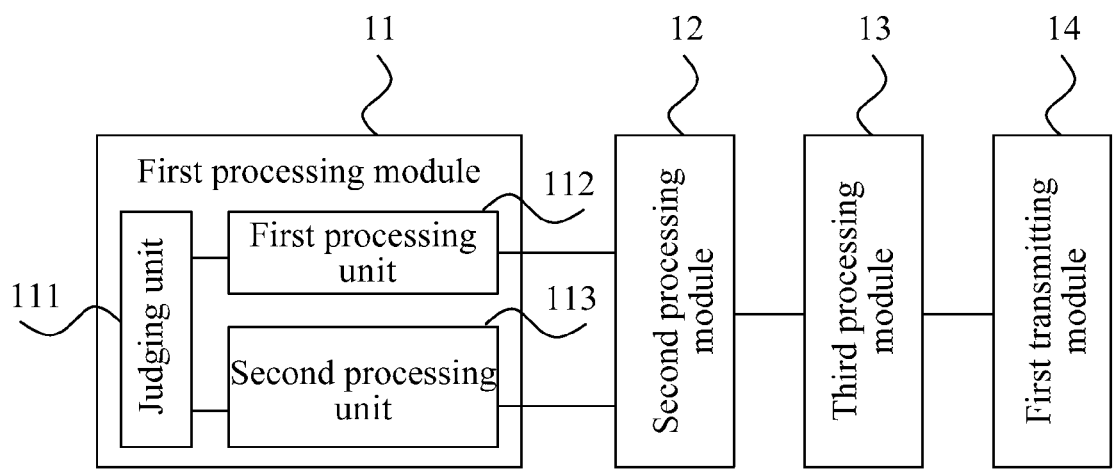
FIG. 5 is a schematic structural diagram of a base station according to another embodiment of the present invention.

FIG. 5 is a schematic structural diagram of a base station according to another embodiment of the present invention. As shown in FIG. 5, based on the structure of the base station shown in FIG. 4, the base station in this embodiment further includes a first transmitting module 14, where the first transmitting module 14 is configured to transmit an index of a codeword corresponding to the precoding matrix to the user equipment. The first processing module 11 further includes a judging unit 111, a first processing unit 112, and a second processing unit 113. The judging unit 111 is configured to judge whether the user equipment is in a sufficient scattering environment or in an insufficient scattering environment. The first processing unit 112 is configured to, after the judging unit 111 judges that the user equipment is in the sufficient scattering environment, select a direction angle from the angle of arrival, where the number of the selected direction angles is greater than the number of antenna array elements of the user equipment, and implement the beamforming in the beam direction corresponding to the selected direction angle; receive an uplink reference signal in the formed beam direction, and obtain the channel matrix according to the uplink reference signal; if the channel matrix is a full-rank matrix, obtain the transformation matrix by composing a unit space eigenvector corresponding to each formed beam; and if the channel matrix is a non-full-rank matrix, reselect the direction angle from the angle of arrival, implement the beamforming in the beam direction corresponding to the reselected direction angle, and determine the transformation matrix according to the beam direction corresponding to the reselected direction angle until the rank of the transformation matrix is full. The second processing unit 113 is configured to, after the judging unit 111 judges that the user equipment is in the sufficient scattering environment, select the direction angle whose received signal strength is higher than a preset threshold from the angle of arrival of the uplink reference signal transmitted by the user equipment, and implement the beamforming in the beam direction corresponding to the selected direction angle; receive the uplink reference signal in the formed beam direction, and obtain the channel matrix according to the uplink reference signal; if the channel matrix is a full-rank matrix, obtain the transformation matrix by composing the unit space eigenvector corresponding to each formed beam; and if the channel matrix is a non-full-rank matrix, reselect the direction angle from the angle of arrival, implement the beamforming in the beam direction corresponding to the reselected direction angle, and determine the transformation matrix according to the beam direction corresponding to the reselected direction angle until the channel matrix meets a system optimization condition.

According to this embodiment, the base station is configured to implement the method in the method embodiment shown in FIG. 2, and the implementation principle is similar, which is not described herein again.

According to this embodiment, for the single-user MIMO, the base station may implement the beamforming on a single array antenna according to the location of the UE and the scattering scenario information, decompose the channel matrix in the beam direction, obtain the equivalent channel matrix, and obtain the optimal precoding matrix by using the equivalent channel matrix. Therefore, according to this embodiment, after a MIMO system is implemented based on the single antenna array, the signals transmitted between the UE and the base station are orthogonal in each beam direction, so a degree-of-freedom gain is obtained, and the feedback overhead is reduced when the base station transmits the precoding matrix to the UE.

Figure 6:
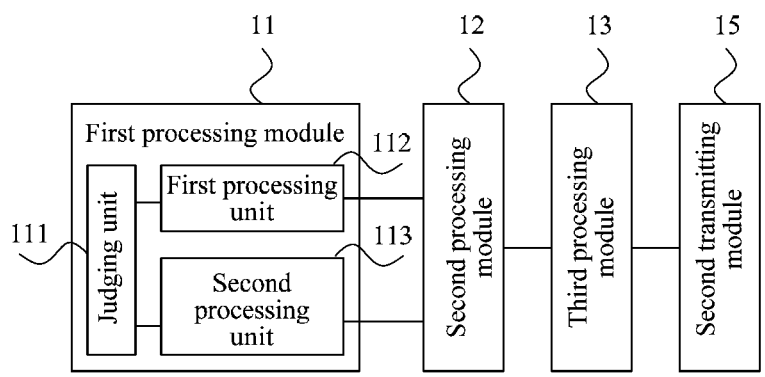
FIG. 6 is a schematic structural diagram of a base station according to still another embodiment of the present invention.

FIG. 6 is a schematic structural diagram of a base station according to still another embodiment of the present invention. As shown in FIG. 6, based on the structure of the base station shown in FIG. 4, the base station in this embodiment further includes a second transmitting module 15, where the second transmitting module 15 is configured to transmit a downlink reference signal to the user equipment according to the equivalent channel matrix, thereby enabling the user equipment to obtain the equivalent channel matrix according to the downlink reference signal and obtain the precoding matrix according to the equivalent channel matrix. The first processing module 11 further includes a judging unit 111, a first processing unit 112, and a second processing unit 113. The judging unit 111 is configured to judge whether the user equipment is in a sufficient scattering environment or in an insufficient scattering environment. The first processing unit 112 is configured to, after the judging unit 111 judges that the user equipment is in the sufficient scattering environment, select a direction angle from the angle of arrival, where the number of the selected direction angles is greater than the number of antenna array elements of the user equipment, and implement the beamforming in the beam direction corresponding to the selected direction angle; receive an uplink reference signal in the formed beam direction, and obtain the channel matrix according to the uplink reference signal; if the channel matrix is a full-rank matrix, obtain the transformation matrix by composing a unit space eigenvector corresponding to each formed beam; and if the channel matrix is a non-full-rank matrix, reselect the direction angle from the angle of arrival, implement the beamforming in the beam direction corresponding to the reselected direction angle, and determine the transformation matrix according to the beam direction corresponding to the reselected direction angle until the rank of the transformation matrix is full. The second processing unit 113 is configured to, after the judging unit 111 judges that the user equipment is in the sufficient scattering environment, select the direction angle whose received signal strength is higher than a preset threshold from the angle of arrival of the uplink reference signal transmitted by the user equipment, and implement the beamforming in the beam direction corresponding to the selected direction angle; receive the uplink reference signal in the formed beam direction, and obtain the channel matrix according to the uplink reference signal; if the channel matrix is a full-rank matrix, obtain the transformation matrix by composing the unit space eigenvector corresponding to each formed beam; if the channel matrix is a non-full-rank matrix, reselect the direction angle from the angle of arrival, implement the beamforming in the beam direction corresponding to the reselected direction angle, and determine the transformation matrix according to the beam direction corresponding to the reselected direction angle until the channel matrix meets a system optimization condition.

According to this embodiment, the base station is configured to implement the method in the method embodiment shown in FIG. 3, and the implementation principle is similar, which is not described herein again.

According to this embodiment, for the single-user MIMO, the base station may implement the beamforming on a single array antenna according to the location of the UE and the scattering scenario information, decompose the channel matrix in the beam direction, obtain the equivalent channel matrix, and generate the downlink reference signal by using the equivalent channel matrix. Therefore, the number of the downlink reference signals generated in this embodiment is equal to the number of the beams and is less than the number of the array elements. Therefore, according to this embodiment, the number of the downlink reference signals is reduced, the complexity of the system design is reduced, and interference in the neighboring cell is avoided. In addition, according to this embodiment, after a MIMO system is implemented based on the single antenna array, the signals transmitted between the UE and the base station are orthogonal in each beam direction, thereby obtaining the degree-of-freedom gain.

Figure 7:
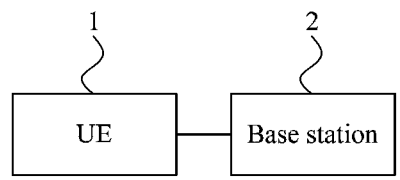
FIG. 7 is a schematic structural diagram of a communications system according to an embodiment of the present invention.

FIG. 7 is a schematic structural diagram of a communications system according to an embodiment of the present invention. As shown in FIG. 7, the communications system in this embodiment includes a UE 1 and a base station 2, where the UE 1 may interact and communicate with the base station 2, and the base station 2 may use a structure in any one of the preceding embodiments corresponding to FIG. 4 to FIG. 6. The implementation principle is similar, and therefore, the content is not described herein again.

According to the communications system in this embodiment, for the single-user MIMO, the base station may implement beamforming on a single array antenna according to information about a direction of arrival of the UE, decompose a channel matrix in a beam direction, obtain an equivalent channel matrix, and obtain an optimal precoding matrix by using the equivalent channel matrix. Therefore, according to this embodiment, after a MIMO system is implemented based on the single antenna array, the signals transmitted between the UE and the base station are orthogonal in each beam direction, thereby obtaining a degree-of-freedom gain.

Persons of ordinary skill in the art should understand that all or a part of the steps of the methods in the embodiments may be implemented by a program instructing relevant hardware. The program may be stored in a computer readable storage medium. When the program is run, the steps of the methods in the embodiments are performed. The storage medium may be any medium capable of storing program codes, such as a ROM, a RAM, a magnetic disk, an optical disk, and the like.

Finally, it should be noted that the embodiments of the present invention are intended for describing the technical solutions of the present invention other than limiting the present invention. Although the present invention is described in detail with reference to the foregoing embodiments, persons of ordinary skill in the art should understand that they can still make modifications to the technical solutions described in the foregoing embodiments or make equivalent substitutions to some technical features thereof, without departing from the spirit and scope of the technical solutions of the embodiments of the present invention.

What is claimed is:

1. A precoding processing method, comprising:
   implementing, by a base station, beamforming on an antenna array according to information about a direction of arrival of a user equipment to obtain a transformation matrix;
   transforming, by the base station, a channel matrix according to the transformation matrix to obtain an equivalent channel matrix; and
   obtaining, by the base station, a precoding matrix required for precoding processing according to the equivalent channel matrix.

2. The method according to claim 1, wherein the implementing beamforming on the antenna array according to the information about the direction of the arrival of the user equipment comprises:
   implementing the beamforming on the antenna array according to scattering path information of an uplink reference signal transmitted by the user equipment.

3. The method according to claim 2, wherein the scattering path information is an angle of the arrival; and, if the user equipment is in a sufficient scattering environment, the implementing the beamforming on the antenna array according to scattering the path information of the uplink reference signal transmitted by the user equipment to obtain the transformation matrix comprises:
   selecting a direction angle from the angle of the arrival, wherein a quantity of selected direction angles is greater than a quantity of antenna array elements of the user equipment, and implementing the beamforming in a beam direction corresponding to the selected direction angles;
   receiving the uplink reference signal in a formed beam direction and obtaining the channel matrix according to the uplink reference signal;
   if the channel matrix is a full-rank matrix, obtaining the transformation matrix by composing a unit space eigenvector corresponding to each formed beam; and
   if the channel matrix is a non-full-rank matrix, selecting a new direction angle from the angle of arrival, implementing the beamforming in a new beam direction corresponding to the selected new direction angle, and determining the transformation matrix according to the beam direction corresponding to the new direction angle until a rank of the transformation matrix is full.

4. The method according to claim 2, wherein the scattering path information is an angle of the arrival, and, if the user equipment is in an insufficient scattering environment, the implementing the beamforming on the antenna array according to the scattering path information of the uplink reference signal transmitted by the user equipment to obtain the transformation matrix comprises:
   selecting a direction angle whose received signal strength is higher than a preset threshold from the angle of the arrival, and implementing the beamforming in a beam direction corresponding to the selected direction angle;
   receiving the uplink reference signal in a formed beam direction and obtaining the channel matrix according to the uplink reference signal;
   if the channel matrix is a full-rank matrix, obtaining the transformation matrix by composing a unit space eigenvector corresponding to each formed beam; and
   if the channel matrix is a non-full-rank matrix, selecting a new direction angle from the angle of the arrival, implementing the beamforming in a new beam direction corresponding to the selected new direction angle, and determining the transformation matrix according to the beam direction corresponding to the new direction angle until the channel matrix meets a system optimization condition.

5. The method according to claim 1, wherein the obtaining the precoding matrix required for precoding processing according to the equivalent channel matrix comprises:
   implementing singular value decomposition on the equivalent channel matrix to obtain the precoding matrix.

6. The method according to claim 1, wherein the obtaining the precoding matrix required for precoding processing according to the equivalent channel matrix comprises:
   transmitting a downlink reference signal to the user equipment according to the equivalent channel matrix, and receiving the precoding matrix transmitted by the user equipment, wherein the precoding matrix is obtained by the user equipment according to the equivalent channel matrix after the equivalent channel matrix is obtained according to the downlink reference signal.

7. A base station, comprising:
a first processing module, configured to implement beamforming on an antenna array according to information about a direction of arrival of a user equipment to obtain a transformation matrix;
a second processing module, configured to transform a channel matrix according to the transformation matrix obtained by the first processing module to obtain an equivalent channel matrix; and
a third processing module, configured to obtain a precoding matrix required for precoding processing according to the equivalent channel matrix obtained by the second processing module.

8. The base station according to claim 7, wherein the first processing module comprises:
a judging unit, configured to judge whether the user equipment is in a sufficient scattering environment or in an insufficient scattering environment;
a first processing unit, configured to, after the judging unit judges that the user equipment is in the sufficient scattering environment, select a direction angle from an angle of the arrival, wherein a quantity of selected direction angles is greater than a quantity of antenna array elements of the user equipment, and implement the beamforming in a beam direction corresponding to the selected direction angle; receive an uplink reference signal in a formed beam direction, and obtain the channel matrix according to the uplink reference signal; if the channel matrix is a full-rank matrix, obtain the transformation matrix by composing a unit space eigenvector corresponding to each formed beam; and if the channel matrix is a non-full-rank matrix, select a new direction angle from the angle of the arrival, implement the beamforming in a new beam direction corresponding to the selected new direction angle, and determine the transformation matrix according to the new beam direction corresponding to the selected new direction angle until a rank of the transformation matrix is full; and
a second processing unit, configured to, after the judging unit judges that the user equipment is in the sufficient scattering environment, select a direction angle whose received signal strength is higher than a preset threshold from the angle of the arrival of the uplink reference signal transmitted by the user equipment, and implement the beamforming in a beam direction corresponding to the selected direction angle; receive the uplink reference signal in the formed beam direction, and obtain the channel matrix according to the uplink reference signal; if the channel matrix is a full-rank matrix, obtain the transformation matrix by composing the unit space eigenvector corresponding to each formed beam; and if the channel matrix is a non-full-rank matrix, select a new direction angle from the angle of the arrival, implement the beamforming in a new beam direction corresponding to the selected new direction angle, and determine the transformation matrix according to the new beam direction corresponding to the selected new direction angle until the channel matrix meets a system optimization condition.

9. The base station according to claim 7, further comprising: at least one of a first transmitting module and a second transmitting module, wherein:
the first transmitting module is configured to transmit an index of a codeword corresponding to the precoding matrix to the user equipment; and
the second transmitting module is configured to transmit a downlink reference signal to the user equipment according to the equivalent channel matrix, thereby enabling the user equipment to obtain the equivalent channel matrix according to the downlink reference signal and obtain the precoding matrix according to the equivalent channel matrix.

* * * * *